United States Patent Office 2,881,201
Patented Apr. 7, 1959

2,881,201
SUBSTITUTED MERCAPTOALKYL ESTERS OF PHOSPHORIC ACIDS AND THEIR DERIVATIVES

Gerhard Schrader, Opladen, Germany, assignor to Farbenfabriken Bayer Aktiengesellschaft, Leverkusen, Germany, a corporation of Germany No Drawing. Application December 1, 1955
Serial No. 550,481

Claims priority, application Germany December 4, 1954

12 Claims. (Cl. 260—461)

This invention relates to substituted mercaptoalkyl esters of phosphoric acids and their derivatives and to a process of preparing such phosphoric derivatives.

It is an object of this invention to provide a new and useful method for the manufacture of substituted mercaptoalkyl esters of phosphoric acids and their derivatives.

It is another object of this invention to provide a process for the manufacture of a plurality of novel substituted mercaptoalkyl esters of phosphoric acids and their derivatives having a marked insecticidal action.

It is a further object of this invention to provide new and useful phosphoric insecticides.

Further objects will become apparent as the following description proceeds.

It is known that neutral esters of thiophosphoric acid may be obtained by reacting dialkyl-phosphoric acid monochlorides with the alkali metal salts of mercaptans. For instance in German Patent 830,508 there are described the reaction products of diethyl-phosphoric acid monochloride with ethylmercapto-ethyl sulphide, methylmercapto-ethyl sulphide, or p-tolylmercapto-ethyl sulphide. These compounds are suitable as insecticides, having systemic action.

In accordance with the invention it has now been found that this reaction is generally applicable, so that a great number of new valuable phosphoric acid esters can be obtained.

These new compounds may be represented by the following formula:

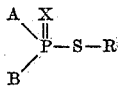

in which X is a member selected from the group consisting of O and S, A is a member selected from the group consisting of alkyl, aryl, alkoxy, dialkyl amino and alkyl mercapto, B is a member selected from the group consisting of dialkyl-amino and alkylmercapto and R is a member selected from the group consisting of alkyl mercapto alkyl, aryl mercapto alkyl and carbalkoxyalkyl radicals.

It has moreover been found that in addition to the dialkyl-phosphoric acid monochlorides there may also be applied the phosphoric acid ester monochlorides, phosphoric acid amide ester monochlorides, phosphoric acid diamide monochlorides, monothiol-phosphoric acid diester monochlorides as well as their corresponding thionophosphoric acid-analogues.

Examples of said monochlorides are methyl phosphonic acid ester monochlorides, ethyl phosphonic acid ester monochlorides, phenyl phosphonic acid ester monochlorides, p-nitrophenyl phosphonic acid ester monochlorides, tolyl phosphonic acid ester monochlorides, phosphoric acid dimethylamide methyl ester monochloride, phosphoric acid diethylamide ethyl ester monochloride, phosphoric acid methylamide ethyl ester monochloride, phosphoric acid diethylamide propyl ester monochloride, phosphoric acid piperidyl ethyl ester monochloride, phosphoric acid di(diethylamide) monochloride, phosphoric acid di(dimethylamide) monochloride, phosphoric acid dimethylamide-diethylamide monochloride; thiolphosphoric acid diethyl ester monochloride, thiolphosphoric acid dimethyl ester monochloride, thiolphosphoric acid S-methyl-O-ethyl ester monochloride, thiolphosphoric acid S-ethyl-O-propyl ester monochloride.

As described above, the corresponding thiono-derivatives of these compounds may be used as starting materials, too. Instead of the chlorides, other corresponding halides may also be employed.

It has further been found that in addition to the known mercapto-ethyl sulphides, mercaptomethyl sulphides as well as their higher homologues or alkylmercapto-carboxylic acid esters are suitable as mercaptan components. Since some of the mercaptomethylmercaptans have been made accessible for the first time quite recently, the present process is of special importance.

Suitable mercaptanes are for instance ethyl mercapto methyl sulfide, propyl mercapto methyl sulfide, butyl mercapto methyl sulfide, phenyl mercapto methyl sulfide, methyl mercapto ethyl sulfide, propyl mercapto ethyl sulfide, phenyl mercapto ethyl sulfide, methyl mercapto propyl sulfide, ethyl mercapto propyl sulfide, phenyl mercapto propyl sulfide, thioglycolic acid methyl ester, thioglycolic acid ethyl ester, β-mercapto propionic acid methyl ester, β-mercapto propionic acid ethyl ester.

It is to be understood that the invention is not restricted to the use of said mercaptans but also other compounds of the abovesaid type can be used with advantage. A great number of these new esters are superior in their action to the previously known esters.

For a better understanding of the invention we are giving below some formulae showing the manner in which the reaction components to be used in the herein described process can be combined.

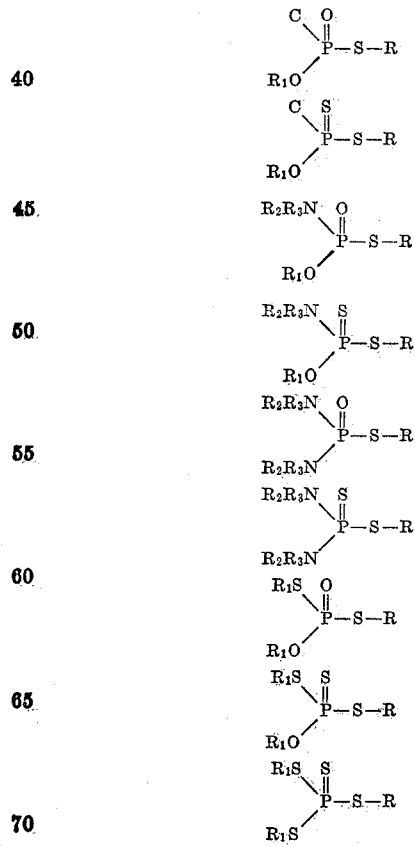

In these formulae, C is a member selected from the group consisting of alkyl and aryl radicals, $R_1$ is a lower alkyl radical and R is a member selected from the group consisting of alkyl mercapto, alkyl, aryl mercapto alkyl and carbalkoxy-alkyl radicals; $R_2$ and $R_3$ are lower alkyl radicals.

The new compounds obtained according to the invention may widely be used as insecticides as such or are suitable as intermediate products for insecticides containing sulphoxide or sulphonic groups.

For carrying out the reaction, the acid chlorides are converted with the corresponding mercaptans in the presence of acid-binding agents. Metal alcoholates, especially alkali metal alcoholates, preferably sodium ethylate, have until now proved to be the most suitable for these reactions; furthermore, anhydrous tertiary amines are suitable acid-binding agents; alkali metal hydroxides or carbonates may also be employed as acid-binding agents.

The condensation generally takes place at a temperature between about 0° and about 150° C., preferably 10 and 60° C.

It is advantageous to carry out the reaction in an inert solvent, for instance alcohols, ethers, benzene, toluene, and xylenes.

The following examples are given for the purpose of illustrating the invention.

*Example 1*

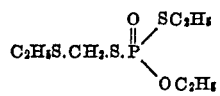

22 grams of 1-mercapto-methyl-thioethyl ether (B.P. 50° C./1 mm. Hg) are dissolved in 50 millilitres of ether. This ethereal solution is added with stirring to 2/10 mol of an alcoholic sodium ethylate solution at 20–25° C. 38 grams of O,S-diethyl-phosphoric acid mono-chloride (B.P. 67° C./2 mm. Hg) are added drop by drop with stirring and cooling at room temperature. Sodium chloride separates out. The salt formed after the reaction is completed is filtered off with suction, the bulk of the solvent is evaporated in vacuo, the residue is taken up with ether and shaken out with 10 millilitres of water. After drying the ethereal solution, the ether is removed by distillation. When fractionating the mixture, 18 grams of the new ester are obtained having a boiling point of 85–87° C. at a pressure of 0.02 mm. Hg.

*Example 2*

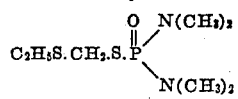

22 grams of mercapto-methyl-thioethyl ether are dissolved in 50 millilitres of ether. This solution is added to 2/10 mol of sodium ethylate at room temperature, and 35 grams of bis-dimethylamino-phosphoric acid monochloride are added thereto drop by drop at about 20–25° C. The mixture is further treated as indicated in Example 1, and 25 grams of the new ester are obtained having a boiling point of 90° C. at a pressure of 0.01 mm. Hg. The colourless sparingly water-soluble ester shows strong contact insecticidal properties and systemic actions.

*Example 3*

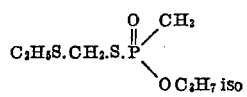

22 grams of mercapto-methyl-thioethyl ether are dissolved in 50 millilitres of ether, and added as described in Examples 1 and 2 to 2/10 mol of a sodium ethylate solution. During the introduction of 32 grams of methyl-phosphoric-acid-chloro-isopropyl ester, common salt separates already out in fine crystals at room temperature. After the reaction is completed the mixture is further treated in a usual manner. 18 grams of the new ester are obtained having a boiling point of 72° C. at a pressure of 0.01 mm. Hg. The ester not yet described in literature is colourless and distinguishes itself by strong systemic insecticidal actions.

*Example 4*

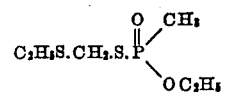

22 grams of methylmercapto-thioethyl ether are dissolved in 50 millilitres of ether. To this solution are added 2/10 mol of a sodium ethylate solution. To the reaction product are added dropwise 29 grams of methyl-phosphoric-acid-ethyl ester chloride, and the mixture is further stirred at room temperature for an hour after the reaction is completed. 26 grams of the ester having a boiling point of 73° C. at a pressure of 0.01 mm. Hg are obtained after usual treatment.

*Example 5*

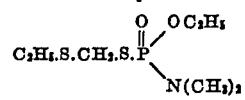

B.P. 82° C. 10.01 mm. Hg.

The above compound is prepared in a similar manner. (Prepared from methylmercapto thioether and dimethyl-mono-chloro-phosphoric acid ethyl ester.)

*Example 6*

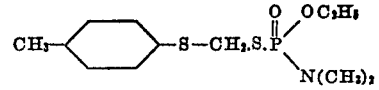

45 grams of mercapto-methylthio-p-tolyl-ether are dissolved in 200 millilitres of ether. 2/10 mol of a sodium ethylate solution are added thereto and then 25 grams of dimethyl-monochloro-phosphoric acid ethylester are introduced drop by drop. After usual treatment 18 grams of the new ester having a boiling point of 120–124° C. at a pressure of 0.01 mm. Hg are obtained.

*Example 7*

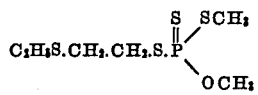

30 grams of mercapto-ethyl-thioethyl-ether are dissolved in 60 millilitres of ether. This solution is added to 2/10 mol of a sodium ethylate solution. 35 grams of O,S-dimethyl-thiophosphoric acid monochloride are added dropwise thereto at 20° C. After usual working up 10 grams of the new ester are obtained having a boiling point of 95° C. at a pressure of 0.01 mm. Hg.

*Example 8*

30 grams of mercaptoethyl-thioethyl ether are dissolved in 30 millilitres of ether, and the solution is added to 2/10 mol of a sodium ethylate solution at 20° C. 35 grams of bis-dimethylamino-phosphoric acid monochloride, diluted with 50 millilitres of ether, are added dropwise thereto. After the reaction is completed the mixture is worked up in the usual way. 25 grams of the ester having a boiling point of 88° C. at a pressure of 0.01 mm. Hg are obtained.

*Example 9*

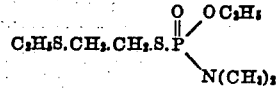

33 grams of mercaptoethyl-thioethyl-ether are added dropwise to the equivalent quantity of sodium ethylate.

33 grams of dimethylamino-monoethyl-phosphoric acid chloride are added thereto with stirring at 40° C. After the reaction has subsided, the mixture is worked up in the usual manner. There are obtained 35 grams of the new ester in the form of a water-insoluble oil having a boiling point of 88° C. at a pressure of 0.01 mm. Hg.

*Example 10*

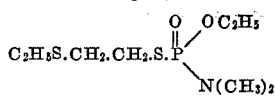

6 grams of sodium are suspended in 50 milliltres of benzene. 36 grams of mercaptoethyl-thioethyl-ether are added thereto. After the reaction is completed, 51 grams of dimethyl-amino-chlorophosphoric acid ethyl ester are added to the mixture. After usual working up there are obtained 29 grams of the new ester having a boiling point of 88–89° C. at a pressure of 0.01 mm. Hg. The substance is little water-soluble. It has a strong systemic action.

*Example 11*

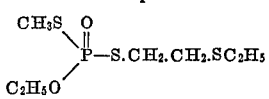

6 grams of sodium are suspended in 50 millilitres of benzene. 36 grams of mercaptoethyl-thioethyl ether are added to the suspension. 52 grams of S-methyl-O-ethyl-phosphoric acid monochloride are added dropwise to the mixture at 40° C. After working up the mixture there are obtained 27 grams of the new ester as a water-insoluble oil having a boiling point of 102° C. at a pressure of 0.05 mm. Hg.

*Example 12*

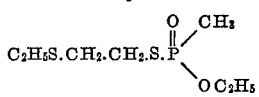

30 grams of mercaptoethyl-thioethyl ether are diluted with 30 millilitres of ether and added to 2/10 mol of sodium ethylate. 29 grams of methylphosphonic acid chloroethyl ester diluted with 100 millilitres of ether are added to the mixture drop by drop with stirring at room temperature. The mixture is kept at 20° C. for a half hour and then worked up in usual manner. 27 grams of the new ester having a boiling point of 83° C. at a pressure of 0.01 mm. Hg are obtained. The compound distinguishes itself by a strong contact insecticidal and systemic action.

*Example 13*

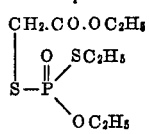

24 grams of thioglycollic acid ethyl ester are dissolved in 50 millilitres of ether and added to 2/10 mol of a sodium ethylate solution at room temperature. 38 grams of O,S-diethyl-phosphoric acid monochloride are added dropwise with stirring to this mixture, the reaction is finished and the whole is worked up in usual manner. 18 grams of the new ester having boiling point of 105° C. at a pressure of 0.05 mm. Hg are obtained.

*Example 14*

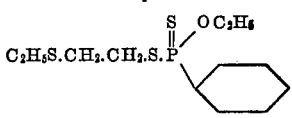

25 grams of β-mercaptoethyl-thioethyl ether are diluted with 25 millilitres of ether, and the solution is added drop by drop with stirring to 64 grams of an alcoholic sodium ethylate solution (2/10 mol). This mixture is then treated with stirring with 44 grams of phenyl-thiophosphonic acid-chlorethyl ester while cooling so that the temperature cannot rise above 30° C. After the reaction is completed the raw product is diluted with ice-water, the water-insoluble oil is taken up with chloroform, dried and fractionated. The new ester is obtained in 55% yield having a boiling point of 126° C. at a pressure of 0.01 mm. Hg.

We claim:

1. Phosphorus acid derivatives of the formula

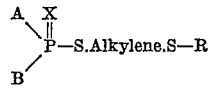

in which A is a radical selected from the group consisting of $-OR_1$, $-NHR_1$ and $-N(R_1)R_2$; B is a radical selected from the group consisting of $-SR_1$, $-NHR_1$, $-N(R_1)R_2$ and, when A is $-OR_1$, B is a radical selected from the group consisting of $-SR_1$, $-NHR_1$, $-N(R_1)R_2$, and $R_3$; $R_1$ and $R_2$ are lower alkyl radicals, $R_3$ is a radical selected from the group consisting of lower alkyl, and phenyl; R is a radical selected from the group consisting of lower alkyl, lower alkyl phenyl, and phenyl; and X is a member selected from the group consisting of oxygen and sulfur.

2. The phosphorus acid derivatives of claim 1 wherein A is $-OR_1$; B is $-N(R_1)R_2$; X is oxygen and R is lower alkyl.

3. The phosphorus acid derivatives of claim 1 in which A is $-OR_1$; B is $-N(R_1)R_2$; X is sulfur and R is lower alkyl.

4. The phosphorus acid derivatives of claim 1 in which A and B are each $-N(R_1)R_2$; and X is oxygen and R is lower alkyl.

5. The phosphorus acid derivatives of claim 1 in which A and B are each $-N(R_1)R_2$; and X is sulfur and R is lower alkyl.

6. Phosphorus acid derivatives of claim 1 in which A is $-OR_1$; B is $-SR_1$; X is oxygen and R is lower alkyl.

7. Phosphorus acid derivatives of claim 1 in which A is $-OR_1$; B is $-SR_1$; X is sulfur and R is lower alkyl.

8. The phosphorus acid derivative of the formula

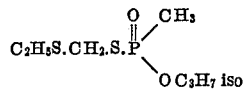

9. The phosphorus acid derivative of the formula

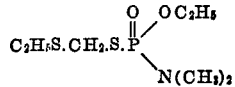

B. P. 82° C./0.01 mm. Hg.

10. The phosphorus acid derivative of the formula

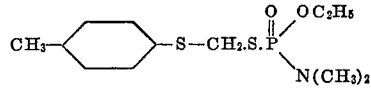

11. The phosphorus acid derivative of the formula

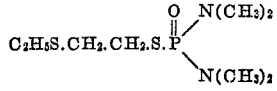

12. The phosphorus acid derivative of the formula

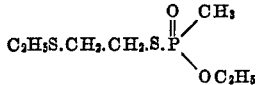

(References on following page)

References Cited in the file of this patent

UNITED STATES PATENTS

| | | |
|---|---|---|
| 2,192,921 | Lipkin | Mar. 12, 1940 |
| 2,508,364 | Bell | May 23, 1950 |
| 2,565,921 | Hook et al. | Aug. 23, 1951 |
| 2,571,989 | Schrader | Oct. 16, 1951 |
| 2,586,655 | Hook et al. | Feb. 19, 1952 |
| 2,596,076 | Hook et al. | May 6, 1952 |
| 2,597,534 | Schrader | May 20, 1952 |
| 2,736,726 | Gaetzi et al. | Feb. 28, 1956 |
| 2,759,010 | Lorenz et al. | Aug. 14, 1956 |

FOREIGN PATENTS

| | | |
|---|---|---|
| 830,508 | Germany | Feb. 4, 1952 |

OTHER REFERENCES

Kosolapoff: "Chemical Abstracts," vol. 48, pp. 6639–6640, pp. 9902–9903 (1954).